(12) United States Patent
Farcasiu

(10) Patent No.: US 7,032,181 B1
(45) Date of Patent: Apr. 18, 2006

(54) OPTIMIZED USER INTERFACE FOR SMALL SCREEN DEVICES

(75) Inventor: Alexandru Farcasiu, Southlake, TX (US)

(73) Assignee: Good Technology, Inc., Santa Clara, CA (US)

( * ) Notice: Subject to any disclaimer, the term of this patent is extended or adjusted under 35 U.S.C. 154(b) by 652 days.

(21) Appl. No.: 10/174,715

(22) Filed: Jun. 18, 2002

(51) Int. Cl.
*G06F 15/00* (2006.01)

(52) U.S. Cl. ........................ 715/764; 455/566
(58) Field of Classification Search ............... 715/853, 715/854, 752, 763, 764, 765; 455/565, 566
See application file for complete search history.

(56) References Cited

U.S. PATENT DOCUMENTS 6,219,694 B1   4/2001  Lazaridis et al.
6,732,102 B1 *  5/2004  Khandekar ................. 707/10
6,839,575 B1 *  1/2005  Ostergaard ................ 455/566

* cited by examiner

*Primary Examiner*—Cao (Kevin) Nguyen
(74) *Attorney, Agent, or Firm*—Blakely Sokoloff Taylor & Zafman, LLP

(57) ABSTRACT

A method and system is provided for allowing a user to selectively display tabular data on a display screen of a mobile device wherein an operating system of the mobile device does not provide a low memory solution to display tabular data. After selecting at least one set of tabular data stored on a remote database to be displayed on the display screen of the mobile device, the tabular data is downloaded to the mobile device. One or more columns of the tabular data are selected to be displayed, and the selected columns of the tabular data are displayed on the limited display screen of the mobile device. A master column can be specified so that it will remain unchanged when the user scrolls the tabular data around.

13 Claims, 6 Drawing Sheets

Tables List Screen

| | Office No. | Cell No. | Home |
|---|---|---|---|
| Name 1 | 1234567 | 2234567 | 3334567 |
| Name 2 | 2345678 | 3345678 | 3345678 |
| Name 3 | 3456789 | 4456789 | 5456789 |

Fig. 4

| Cell No. | |
|---|---|
| 1234567 | Name 1 |
| 2345678 | Name 2 |

Fig. 5

| Office No. | |
|---|---|
| Name 1 | 2234567 |
| Name 2 | 3345678 |

Fig. 6

OPTIMIZED USER INTERFACE FOR SMALL SCREEN DEVICES

BACKGROUND OF THE INVENTION

The present invention relates generally to computer software, and more particularly, to user access to tabular data stored on small screen communication devices such as mobile phones and PDAs.

Mobile communication devices have made significant development recently. Another trend that has been observed is the convergence of traditional PDAs such as personal organizers with the mobile phones. More features have been added to the mobile phones, and more data can be accessed from the mobile phones as well. However, there is still a considerable limitation for the memory space on the mobile device so that many complicated applications operable on a regular computer may not operate on the mobile device.

In computer applications, many applications use tabular data wherein information is arranged in columns and rows. Each entry of a table is thus identified by a column and row. Unfortunately, the tabular format of data is not supported by many mobile devices. One of the reasons is that the small-screen mobile devices use "Java 2 Micro Edition" or J2ME as a run time operating software.

One approach is to provide a table library for any particular application on the mobile device. This approach may sound feasible, but actually impractical since the table library takes too much memory space of the mobile device. For example, a regular mobile phone has any where between 50K to 1 M bytes of memory space, and a typical table library may occupy 20K bytes.

What is needed is an efficient method for displaying tabular data on a small display of a mobile device without using a tabular library to be stored in the device.

SUMMARY OF THE INVENTION

A method and system is provided for allowing a user to selectively display tabular data on a display screen of a mobile device wherein an operating system of the mobile device does not provide a low memory solution to display tabular data. After selecting at least one set of tabular data stored on a remote database to be displayed on the display screen of the mobile device, the tabular data is downloaded to the mobile device. One or more columns of the tabular data are selected to be displayed, and the selected columns of the tabular data are displayed on the limited display screen of the mobile device. A master column can be specified so that it will remain unchanged when the user scrolls the tabular data around.

BRIEF DESCRIPTION OF THE DRAWINGS

FIG. 4 illustrates a small screen that can only display two or three columns of tabular data.

FIG. 5 illustrates an initial display of a small screen which only shows two people's names and corresponding office numbers.

FIG. 6 illustrates a display of a small screen which has a master column stay unchanged while the user scrolls in different directions.

DESCRIPTION OF THE PREFERRED EMBODIMENT

Figure 1:
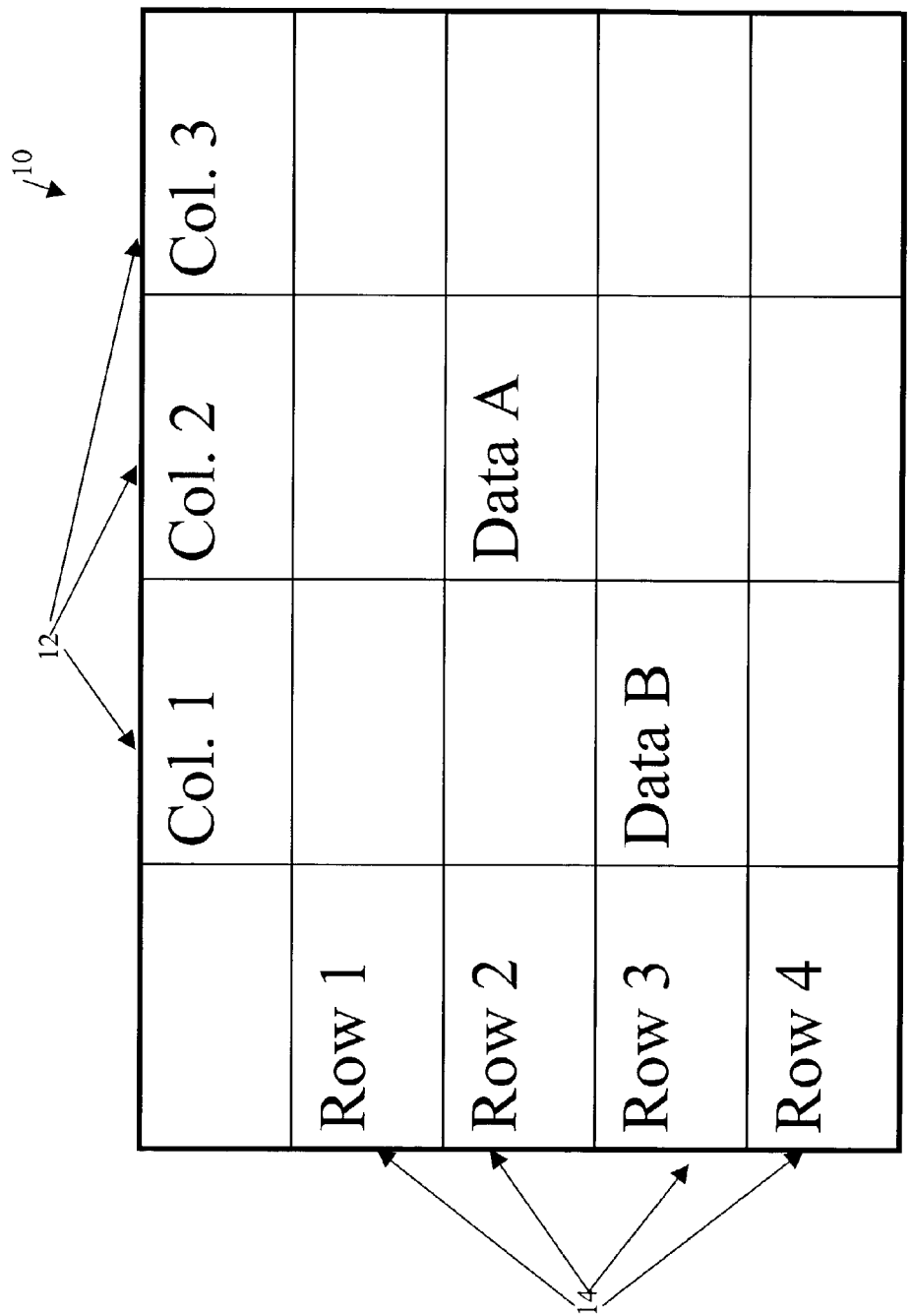
FIG. 1 illustrates a tabular data form as displayed on a desktop computer.

FIG. 1 illustrates a tabular data form 10 as displayed on a desktop computer. A tabular data form (or "table") is very popular for various applications. In a table, a user can display multiple columns 12 and rows 14, wherein each data entry (e.g., Data A and B) can be located by indexing through the row and column numbers. In computer databases, tables are also used frequently because it is easy to find a data entry through two indexes of the tables (e.g., column number and row number). A display screen like a desktop computer can easily present multiple columns and rows of data to a user so that the user can have relatively full view of the information presented. This luxury does not exist on a small screen display of a mobile computing device such as a cell phone display. A typical small computing or communications device such as a Palm type device or cell phone has two major hardware limitations. One, the display area is very limited due to the compact size it features. Two, the memory space of the device is also restrained also because of hardware "real estate" concerns. As such, a typical display screen can only show a small number of horizontal lines. To present a table on such a small display screen is, at the present time, very impractical.

Figure 2:
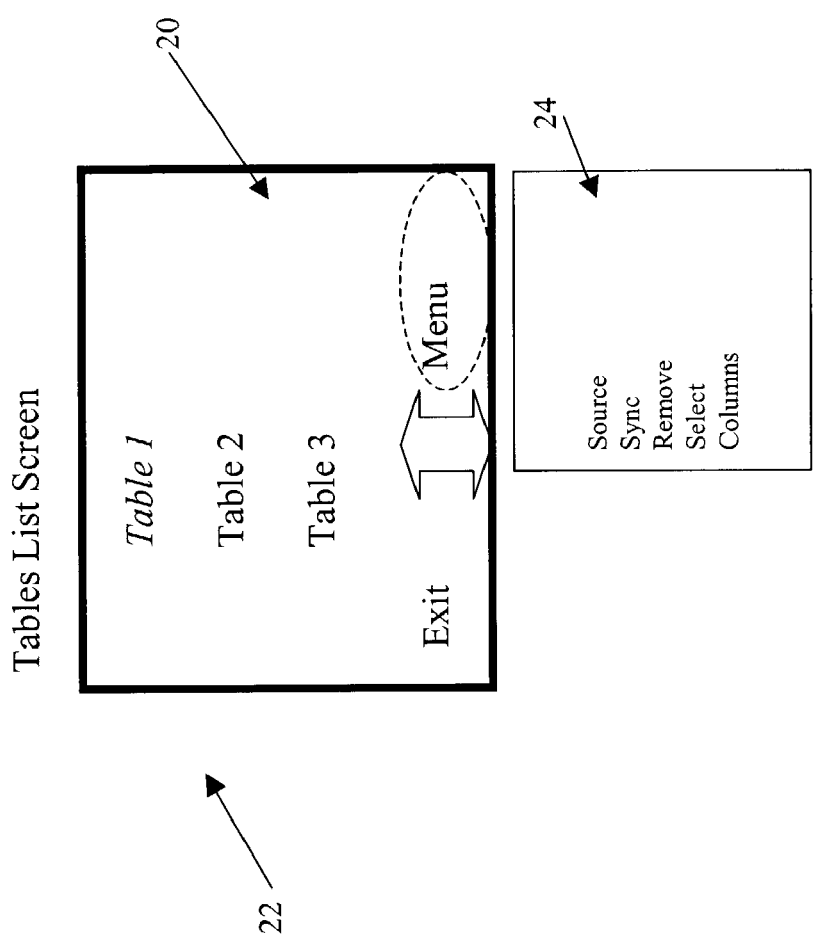
FIG. 2 illustrates a small screen exhibiting a selection list for choosing one of a number of tables.

The present disclosure provides a method and system to display information in the tabular data form on a small display screen of a mobile device. FIG. 2 illustrates a small display 20 exhibiting a selection list for displaying one of a number of tables. By moving a pointer icon such as the arrow 22, the user can select a particular table to be synchronized with a remote storage device such as a remote computer server. For illustration purposes, the selected table is put in italics. After the user has made such a selection, the selected table is downloaded from the remote computer server to the mobile device. This individual download process is to cope with the limited memory space on the mobile device so that minimum data is temporally stored on the mobile device. Alternatively, if the mobile device can have ample memory space, multiple tables can be downloaded. Also shown in FIG. 2 is a pull-down menu 24 which further allows the user to carry out several administration operations such as Select, Sync, Source, Preset, Remove, Columns, etc. The user can select "Source" to specify which remote storage device he intends to "pull" some data from. The "Sync" feature in the pull-down menu initiates a synchronization session with the remote storage device. The "Remove" feature allows the user to remove any selected table from the mobile device.

Figure 3:
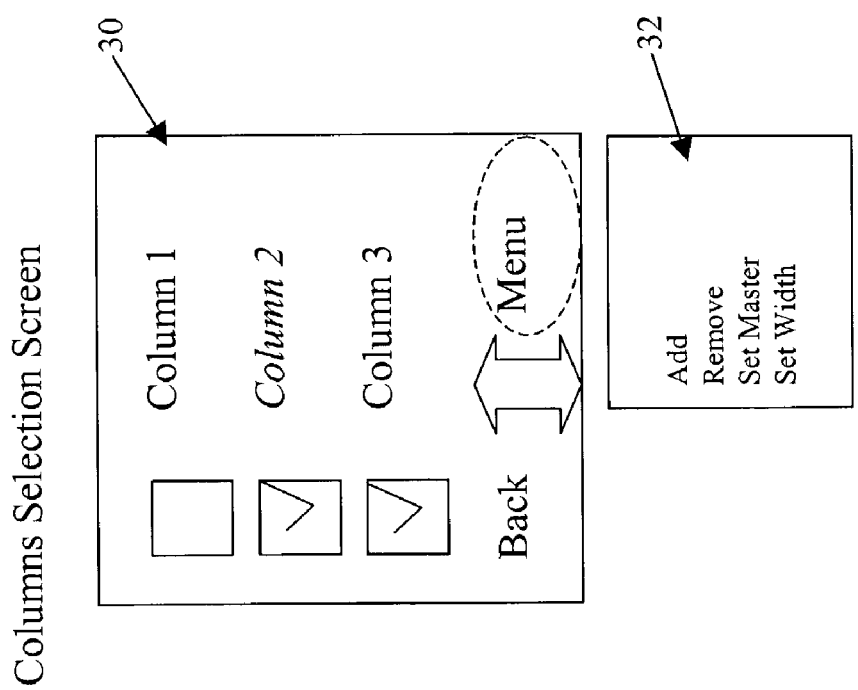
FIG. 3 illustrates a small screen exhibiting a selection list for choosing one or more columns of a table to be displayed.

The "Columns" feature allows the user to select particular columns of data in the table to be displayed on the limited space of the small display screen. If the user selects this feature, another screen 30 will show as it is illustrated in FIG. 3. In FIG. 3, the user can "check" particular columns to be displayed on the mobile device. Moreover, the user can also invoke the pull-down menu 32 to add or remove the columns, or set the width of the columns.

Figure 5:
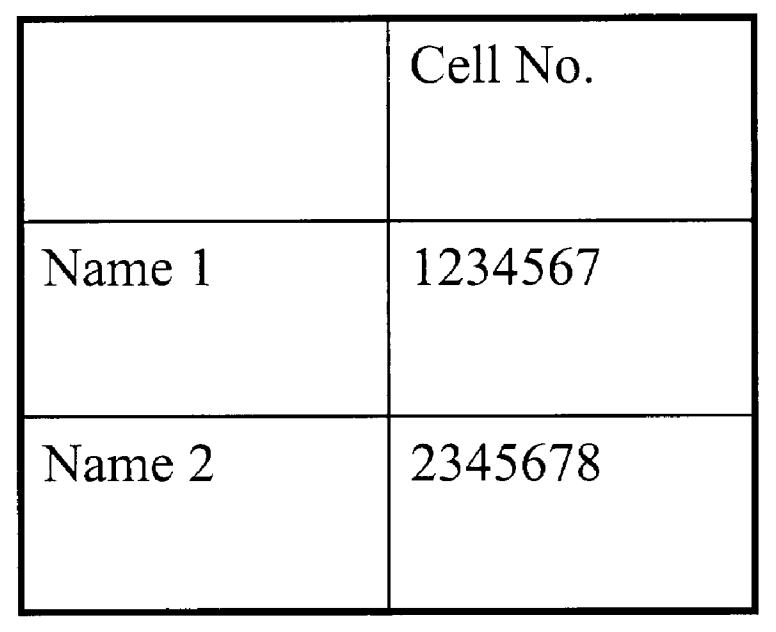
Figure 6:
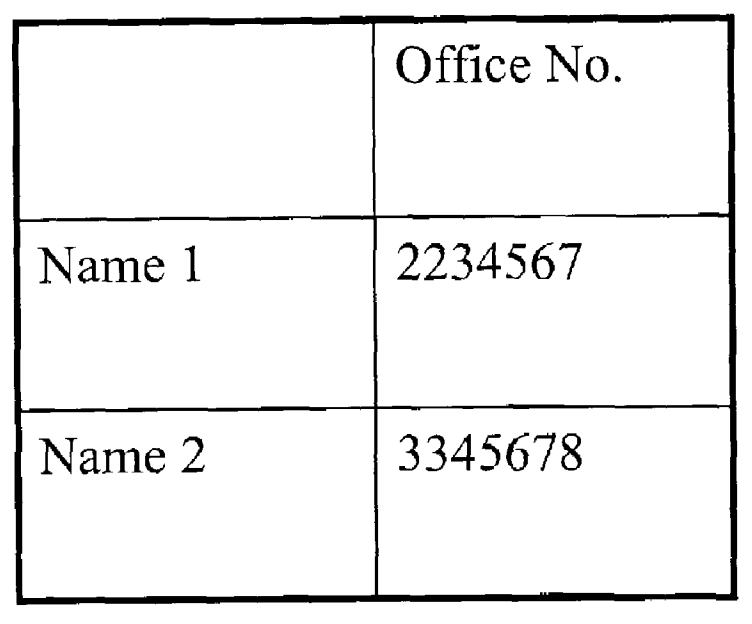

One useful feature is "Set Master," which allows the user to specify a column to be unchanged while the user can scroll the contents shown on the screen in either left or right direction. The master column thus helps the user to understand the context in which the data is displayed. For example, in a mobile phone, numerous contact information such as the office number, cell phone number, or home phone number of a person is stored. Since the display screen on the mobile phone is very small in some cases, and only two or three columns can possibly be squeezed in. As shown in FIG. 4, assuming that there are at least three columns of telephone numbers listed in a table, but the screen on the mobile phone can only display two columns at any time. FIG. 5 illustrates the initial display of the mobile phone display which only shows two people's names and corresponding office numbers. If the user specifies the "name" column to be the master column, and if he scrolls the screen to the right, what he will see is illustrated in FIG. 6, wherein the column for the "name" stays the same so that the user can see the correlation between the names and the phone numbers, with the second column now showing people's cell phone numbers. With the master column set unchanged, the user can easily scroll up and down to find the appropriate number that he is looking for. When a master column is selected, the number of characters to be shown for that column can also be specified.

The technical difficulty in implementing this feature is that the J2ME compatible systems do not support tables. To overcome this deficiency, changes have to be made to the program that generates the displayed table. In one example, the tabular data shown on the display screen is actually formed by multiple lines of data with no particular "table" framework. After the multiple lines of data streams are displayed, they all seem aligned in rows and columns as they are in a table because they have the same line format although they are actually not in a table. When the user scrolls to the right, the master column is created again in the data stream so that it looks as if the master column is not changed.

The disclosure above with respect to dealing with the data in the columns can also apply to data in rows. For example, when the user scrolls up and down, a particular row can be selected as a master row such as a title row and will be constantly showing on the display.

While the method and system has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for allowing a user to selectively display tabular data on a display screen of a mobile computing device, the method comprising:
   selecting at least one table stored on a remote database to be displayed on the display screen;
   downloading the selected table to the mobile computing device;
   selecting from the mobile computing device one or more columns of the table to be displayed;
   specifying a master column of the table wherein the specified master column stays unchanged when the user scrolls the displayed table left or right; and
   displaying the selected columns of the table,
   wherein an operating system of the mobile computing device does not provide a low memory solution to display the tabular data.

2. The method of claim 1 wherein the step of specifying further includes programming a constant stream of data for repetitively generating and displaying the data of the master column when the user scrolls.

3. The method of claim 1 further comprising specifying a master row of the table wherein the specified master row stays unchanged when the user scrolls the displayed table up or down.

4. The method of claim 3 further includes programming a constant stream for repetitively generating and displaying the data of the master row when the user scrolls.

5. The method of claim 1 further comprising listing one or more tables on a user interface of a remote computer to allow the user to give access thereof to the mobile computing device, the remote computer and the mobile computing device being connected through a communications link.

6. The method of claim 1 wherein the mobile computing device is a J2ME compatible device.

7. The method of claim 1 further comprising listing one or more sets of tables on the display screen of the mobile device for the user to select.

8. A machine-readable medium having stored thereon data representing sets of instructions which allows a user to selectively display tabular data on a display screen of a J2ME compatible mobile computing device, which when executed by the mobile computing, causes the mobile computing to perform:
   selecting at least one table stored on a remote database to be displayed on the display screen;
   downloading the selected table to the mobile computing device;
   selecting from the mobile computing device one or more columns of the table to be displayed;
   specifying a master column of the table wherein the specified master column stays unchanged when the user scrolls the displayed table left of right; and
   displaying the selected columns of the table,
   wherein an operating system of the mobile computing device does not provide a low memory solution to display the tabular data.

9. The machine-readable medium of claim 8 wherein the instructions for specifying further includes instructions for creating a constant stream of data for repetitively generating and displaying the data of the master column when the user scrolls.

10. The machine-readable medium of claim 8 further comprising specifying a master row of the table wherein the specified master row stays unchanged when the user scrolls the displayed table up or down.

11. The machine-readable medium of claim 10 further includes instructions for creating a constant data stream for repetitively generating and displaying the data of the master row when the user scrolls.

12. The machine-readable medium of claim 8 further comprising instructions for listing one or more tables on a user interface of a remote computer to allow the user to give access thereof to the mobile computing device, the remote computer and the mobile computing device being connected through a communications link.

13. The machine-readable medium of claim 8 further comprising listing one or more sets of tables on the display screen of the mobile device for the user to select.

* * * * *